United States Patent [19]

Hosaka

[11] 3,949,357

[45] Apr. 6, 1976

[54] OPERATION RECORDER FOR MOTOR VEHICLE SAFETY DEVICE

[75] Inventor: Akio Hosaka, Yokohama, Japan

[73] Assignee: Nissan Motor Co., Ltd., Yokohama, Japan

[22] Filed: July 30, 1974

[21] Appl. No.: 493,133

Related U.S. Application Data

[63] Continuation-in-part of Ser. No. 463,836, April 24, 1974, abandoned, which is a continuation-in-part of Ser. No. 314,526, Dec. 13, 1972, abandoned.

[30] Foreign Application Priority Data

Feb. 9, 1972 Japan.............................. 47-14119

[52] U.S. Cl..... 340/52 H; 180/103 A; 280/150 AB; 340/248 A
[51] Int. Cl.²......................................... G08B 21/00
[58] Field of Search............ 340/52 R, 52 H, 248 A, 340/214, 262, 61; 307/10 R; 180/91, 103 R, 103 A; 280/150 AB

[56] References Cited
UNITED STATES PATENTS 3,622,974   11/1971   Best et al. ......................... 340/52 H
3,629,816   12/1971   Gillund ................................. 340/61
3,849,759   11/1974   Hosaka et al. ..................... 340/52 R Primary Examiner—John W. Caldwell
Assistant Examiner—Joseph E. Nowicki

[57] ABSTRACT

An operation recorder to record a malfunction of a safety device or to record a proper function of the safety device comprises an AND-output gate. The AND-output gate is connected at its input side with the outputs of first and second monostable-multivibrators and at its output side to a memory. The first monostable-multivibrator normally generates a logical one output and a logical zero output signal, when it is triggered by the output of a collision sensor, for 10 to 100 milliseconds. The second monostable-multivibrator normally generates a logical zero output signal and a logical one output signal, when a safety device is actuated, for relatively shorter time than 10 to 100 milliseconds. The AND-output gate supplies a logical one output to the memory to generate the same when it receives logical one input signals.

4 Claims, 2 Drawing Figures

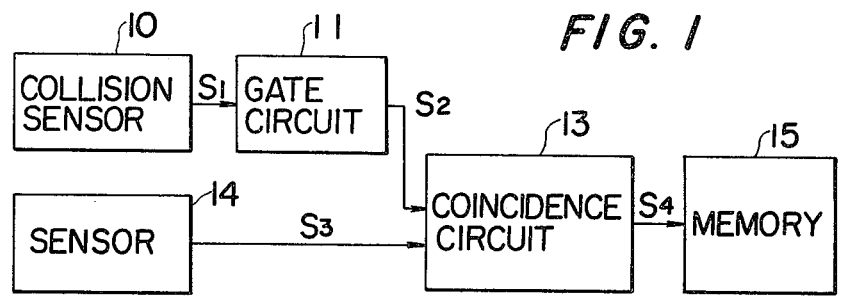

OPERATION RECORDER FOR MOTOR VEHICLE SAFETY DEVICE

This application is a continuation-in-part application of my pending application Ser. No. 463,836, filed on Apr. 24, 1974, which application is a continuation application, now abandoned of my application Ser. No. 314,526, filed on Dec. 13, 1972, which is now abandoned.

This invention relates to an operation recorder for a motor vehicle safety device which is capable of determining whether the safety device is actuated immediately after a collision of the motor vehicle.

Heretofore, many safety devices have been proposed for use on motor vehicles. In certain of them, an inflatable confinement called the "gas bag" is provided which, at the time of a collision, is automatically expanded to a protective condition to avoid injuries including whip-lash injuries to the vehicle occupants. In protecting the occupants, the gas bag is spread out before the occupants so as to envelop their heads and shoulders, tending to obstruct the driver's sight. Thus, if the safety device of this type malfunctions, being suddenly actuated without a collision condition being sensed, then, since the driver's vision is restricted, it may happen that the vehicle deviates from the intended course and comes into collision with another vehicle or a structure in the path of advance. On the other hand, if the safety device is actuated at a relatively long time after a collision takes place, it will fail to protect the vehicle occupants from injuries.

In this connection, it should be noted that in investigating a wrecked motor vehicle it is extremely difficult to determine whether the safety device operated in a satisfactory manner at the time of a collision, since there may be substantially no difference in the conditions of the wreck between the above two cases and the one where the safety device was actuated properly, i.e., immediately after a collision condition having been sensed. Thus, in an accident involving a motor vehicle equipped with a safety device of the above-mentioned type, there is a possibility that trouble will arise between the occupants and the manufacturer in placing the responsibility for the accident.

Therefore, it is an object of the present invention to provide an operation recorder for a motor vehicle safety device which is capable of providing information on whether the safety device was actuated immediately after a collision takes place or not.

Another object of the invention is to provide an operation recorder for a motor vehicle safety device which makes it possible to determine whether the safety device operated in a satisfactory manner at the time of a collision or not, by investigating the wreck.

It is a further object of the invention to provide an operation recorder for a motor vehicle safety device which is relatively simple in construction and reliable in operation.

These and other objects will be readily apparent from the following description of the invention when read in conjunction with the accompanying drawing, in which:

FIG. 1 is a block diagram illustrating the principles of the operation recorder embodying the invention; and FIG. 2 is a circuit diagram of a typical example of the operation recorder shown in FIG. 1.

Referring now to FIG. 1, reference numeral 10 designates a collision sensor which is responsive to a collision condition of the vehicle to produce a signal $S_1$ indicative thereof. A gate circuit 11 is provided for generating a signal $S_2$ of a predetermined time duration in response to the signal $S_1$. The predetermined time duration is of the order of from 10 to 100 milliseconds and is so selected as to be somewhat longer than the time required for the ordinary motor vehicle safety device to be actuated after a collision begins. The signal $S_2$ is supplied to one input of a coincidence circuit 13, the other input of which is connected to a sensor 14 so as to be supplied with a signal $S_3$ of a predetermined time duration considerably shorter than that of $S_2$ therefrom. The signal $S_3$ is indicative of the actuation of a known safety device, such as an inflatable confinement or a gas bag adapted to be automatically expanded to a protective condition at the time of a collision. The coincidence circuit 13 functions to supply a signal $S_4$ to a memory 15 upon coincidence of the signals $S_2$ and $S_3$. Thus, by investigating the memory 15 of a wrecked motor vehicle, it is possible to determine whether the safety device was or was not actuated at a proper time, i.e., within the predetermined time period after a collision condition began.

Referring to FIG. 2, there is illustrated a typical example of the operation recorder of the invention shown in FIG. 1.

The collision sensor 10 is herein represented by a switch enclosed within a broken line rectangle. The switch is adapted to be closed upon a collision of the vehicle and, for example, it is of the type comprising a weight of magnetic material which is normally abutting on a magnet but is moved to engage two contacts, against the attractive force of the magnet due to a rapid deceleration caused by a collision of the vehicle. Alternatively, the switch may comprise two tape like contacts facing each other and mounted on a collapsible protruding portion of the vehicle, such a bumper, from end to end. The collision switch 10 is connected to the input of a monostable-multivibrator acting as the gate circuit 11. As described above, the monostable-multivibrator 11 functions to normally generate a true "1" signal and to generate a false "0" as the signal $S_2$ having its width equal to approximately 100 milliseconds in response to the signal $S_1$, i.e., upon closure of the collision switch 10. The gate signal $S_2$ is supplied from the monostable-multivibrator 11 to one input of an AND gate comprising the coincidence circuit 13.

Shown as enclosed within a broken line rectangle 20 is a trigger mechanism for triggering the safety device (not shown), which mechanism includes an electrically actuable detonation element 21, and two collision sensors 23 and 24, connected in series across a battery 25. A single detonation element is herein shown by way of simplicity of illustration, the element 21 being electrically actuable to explode so as to release pressurized gas from a gas source for instantaneous inflation of the gas bag, however, a plurality of elements and gas bags may be used. The collision sensors 23 and 24, being similar to the collision sensor 10, are of the type comprising an impact-response switch which is adapted to be closed in response to a collision condition of the vehicle.

Resistors 28 and 29 are respectively connected across their associated collision sensors 23 and 24 so as to enable the detection of the burn-out of the detonation element 21 caused by explosion. The values of resistance of the resistors 28 and 29 and the detonation element 21 are so selected that $R_{28} \approx R_{29} > R_{21}$. Thus, at a time before the safety device is actuated, there is no appreciable voltage drop across the detonation element 21, i.e., the voltage at points (a) and (b) is approximately 6 volts. On the other hand, if the safety device is actuated by the explosion of the detonation element 21, then, since the element 21 has burnt out, the voltages at points (a) and (b) become 12 and 0 volts, respectively.

Connected at points (a) and (b) is the sensor 14 for generating the signal $S_3$ is response to actuation of the safety device, as described above. In this embodiment, the sensor 14 includes two comparators 32 and 33 which are connected to the points (a) and (b), respectively, and have their respective reference levels equal to 8 and 4 volts. The output of the comparator 32 is connected through an inverter 36 to one input of an NOR gate 35 and, on the other hand, that of the comparator 33 is connected directly to another input of the NOR gate 35. The output of the NOR gate 35 is connected to the input of a monostable-multivibrator 43. The monostable-multivibrator 43 functions to normally generate a false 0 signal and to generate a true 1 signal, as the signal $S_3$, having its time width considerably shorter than 100 milliseconds in response to the change of the output of the NOR gate 35 from a false 0 signal to a true 1 signal i.e., when the safety device is actuated. The output of the monostable-multivibrator 43 is connected to the other input of the AND gate 13 to supply the signal $S_3$ thereto.

In the illustrated embodiment, the memory 15 is of the form of an electric fuse 40 which is connected in series with a transistor 41 across the battery 25. The base of the transistor 41 is connected through a resistor 42 to the output of the AND gate 13 so as to be supplied with the trigger signal $S_4$ therefrom.

The operation of the recorder of the present invention is as follows: when, as described above, the voltage at points (a) and (b) become 12 and 0 volts, respectively, due to the burning out of the detonation element 21 caused by explosion, the comparator 32 produces a true 1 output because its reference voltage, i.e., 8 volts is exceeded by 12 volts applied at its input, while, on the other hand, the other comparator 33 produces a false 0 output because its reference voltage, i.e., 4 volts is greater than the input voltage of 0 volts. The true 1 output of the comparator 32 is inverted by the inverter 36, so that a false 0 signal is supplied from the invertor 36 to the one input of the NOR gate 35. The false 0 output of the comparator 33 is directly applied to the other input of the NOR gate 35. As is appreciated by those familiar with the art of logic circuit design, with the false 0 signals applied at all inputs of the NOR gate 35, there appears at its output a true 1 signal which is applied to the input of the monostable-multivibrator 43. Then, the monostable-multivibrator 43 generates a true 1 signal having its predetermined time width.

If, at this moment, a true 1 signal is present at the one input of the AND gate 13, it produces a true 1 output which is supplied to the transistor 41, rendering it conductive. Conduction of the transistor 41 causes the electric fuse 40 to burn out. Thus, it will be appreciated that when the safety device malfunctions, being actuated prior to a collision of the vehicle, or at more than the predetermined time after a collision takes place, there occurs a coincidence between the input signals applied at the two inputs of the AND gate 35, so that the electric fuse 40 is burnt out. If, on the other hand, the safety device is actuated within the predetermined time period after a collision takes place, the signal $S_2$ from the monostable-multivibrator 11 is in the false 0 state at the moment when the signal $S_3$ is supplied to the AND gate 35, so that the AND gate 35 does not produce the signal $S_4$ to be supplied to the transistor 41. Accordingly, it should be understood that by examining the electric fuse of a wrecked motor vehicle, it can be determined whether the safety device was actuated at a sufficiently short time after a collision began to provide successful protection to the vehicle occupants from injuries.

In the embodiment shown in FIG. 2, the switch acting as the collision sensor 10 is provided separately from the collision sensors 23 and 24 of the safety device trigger mechanism for the purpose of ensuring a more reliable operation of the recorder. However, it will be appreciated that a modification is possible in which the monostable-multivibrator 11 is triggered by either one of the collision sensors 23 and 24 instead of the collision sensor 10.

Further, it will be understood that the monostable-multivibrator 11 could be omitted if such a collision sensor as one characterized by its ability to generate a signal of the predetermined time duration upon sensing a collision is employed as the collision sensor 10. Among such collision sensors as having the above-mentioned characteristics is a switch comprising a combination of a magnet and a weight of magnetic material, or that of a spring member and a weight, in which the weight is normally in a non-operative position but, at the time of a collision, is moved to keep two contacts in electrical contact for a predetermined time period by the cooperation of a resilient material provided in the path of the movement of the weight.

It is to be understood that the function of the AND gate 13 can be accomplished by other arrangements, such as a series combination of a switch adapted to be closed upon actuation of the safety device and a switch adapted to be opened for a predetermined time period upon sensing a collision of the vehicle.

Further, it will be appreciated that among many types of sensor 14 which can be readily thought out by those skilled in the art are a pneumatically controlled switch adapted to be opened and closed in accordance with the pressure in a gas source for storing pressurized gas, a thin conductive wire adapted to be broken upon actuation of the safety device, and a mechanical or electronic switch capable of sensing the expansion of a gas bag when triggered.

Since what is required of the memory 15 is the ability to memorize when a certain voltage is established thereacross, it is understood that other types of memory devices can be employed instead of an electric fuse.

What is claimed is:

1. In a motor vehicle having a collision sensor adapted to provide an output upon a collision of the motor vehicle, and a safety device adapted to be actuated by a trigger mechanism which includes an electrically actuable detonation element, having a relatively small resistance, a DC power source, first and second normally open collision responsive switch means connected to opposite sides of said electrically actuable detonation element and to said DC source, and first and second resistor means connected across first and second switch means:

an operation recorder to record a mulfunction of said safety device comprising;

first means connected to said collision sensor to receive the output thereof, said first means being operable response to the output of said collision sensor to provide a logical zero output having a predetermined time duration;

second means including a first comparator gate means responsive to a voltage at a junction between said first normally open responsive switch means and said electrically detonation element for providing a logical one output when the voltage at said junction exceeds a first predetermined reference voltage; inverter means connected to said first comparator gate means to receive the output thereof for providing a logical zero output responsive to the logical one output of said first comparator gate means; a second comparator gate means responsive to a voltage at a junction between said electrically actuable detonation element and said second normally open collision responsive switch means for providing a logical zero output when the voltage at said last mentioned junction is below a second predetermined reference voltage which is set to be relatively smaller than said predetermined first reference voltage of said first comparator gate means; an NOR logical function gate means connected to said inverter means and to said second comparator gate means to receive the outputs thereof and responsive to logical zero outputs of said inverter means and said second comparator gate means for providing a logical one output; a monostable-multivibrator connected to said NOR logical function gate to receive the output thereof to provide a logical one output having a predetermined time duration shorter than that of the output of said first means when the output of said NOR gate switches to a logical one; and AND logical function gate means connected to said first means to receive the output thereof and to said monostable-multivibrator to receive the output thereof, said AND logical function gate means being responsive to the logical one outputs of said first means and said monostable-multivibrator means for providing a logical one output; a memory means; and means, in circuitry with said memory means and AND logical function gate means, responsive to the logical one output of said AND logical function gate means for energizing said memory means.

2. An operator recorder as claimed in claim 1, in which the predetermined time duration is of the order of 100 milliseconds.

3. An operation recorder as claimed in claim 2, in which said first means is in the form of a a monostable-multivibrator.

4. An operation recorder as claimed in claim 3, in which said last mentioned means is in the form of a transistor adapted to be rendered conductive by the logical one output of said AND logical function gate.

* * * * *